UNITED STATES PATENT OFFICE.

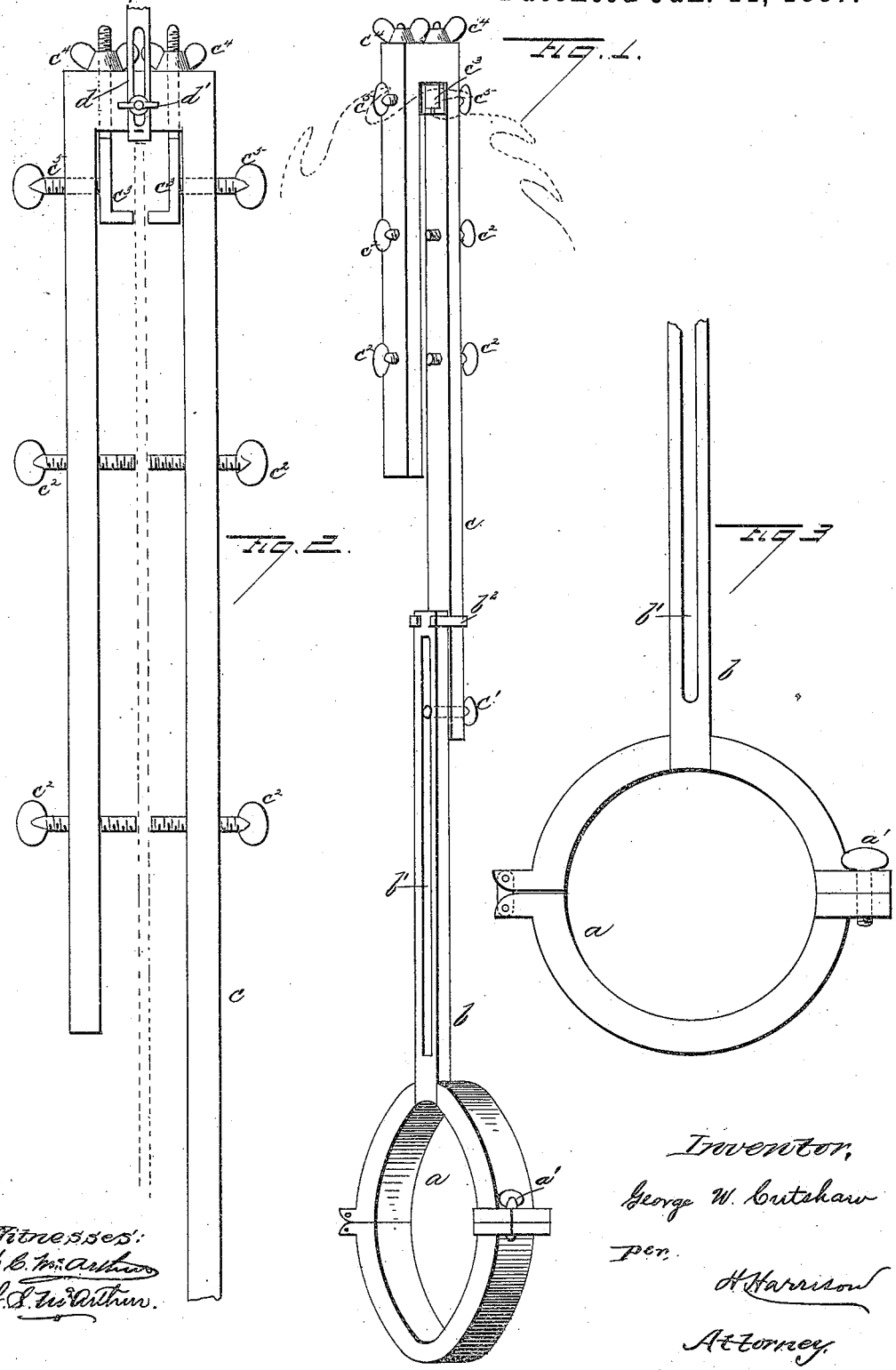

GEORGE W. CUTSHAW, OF BEDFORD, KENTUCKY.

DEVICE FOR DRESSING THE TEETH OF SAWS.

SPECIFICATION forming part of Letters Patent No. 356,059, dated January 11, 1887.

Application filed July 12, 1886. Serial No. 207,749. (No model.)

*To all whom it may concern:*

Be it known that I, GEORGE W. CUTSHAW, a citizen of the United States, residing at Bedford, in the county of Trimble and State of Kentucky, have invented certain new and useful Improvements in Gages for Dressing Saws, of which the following is a specification, to wit:

This invention relates to gages for dressing saws; and it consists in certain peculiarities of the construction and arrangement of the same, substantially as will be hereinafter more fully set forth and claimed.

In order to enable others skilled in the art to which my invention pertains to make and use the same, I will now proceed to describe its construction and operation, referring to the accompanying drawings, in which—

Figure 1 is a perspective view of my gage. Fig. 2 is a side view of the outer end, and Fig. 3 an end view of the inner end, of the same.

$a$ represents a circular ring or collar designed to fit over the saw-mandrel, and made in two parts, hinged upon one side and secured by a set-screw, $a'$, on the other, so it may be readily taken off and placed on the mandrel, as required. To this collar, either permanently or detachably, is secured an arm, $b$, formed with a slot, $b'$, and provided with a loop or guide, $b^2$, at its outer end, through which passes an extension-arm, $c$, provided with a thumb-screw, $c'$, which slides up and down in the slot, and serves to secure the extension at any point desired, according to the radius of the saw to be operated upon. The outer end of the arm $c$ is bent back in U form to pass around the edge of the saw and clasp it upon each side, and each wing of this U-shaped arm is provided with one or more thumb-screws, $c^2$, the points of which are adjusted to bear against the faces of the saw, as indicated by the dotted lines in Fig. 2, and serve to center the arm and guide it properly in its work.

In the upper or outer end of the arm $c$ are placed two L-shaped clamps, $c^3$, the shanks of which are screw-threaded and passed through the bend of the arm, and are provided with thumb-nuts $c^4$ on their outer ends, to adjust them and clamp the files which are held therein against the teeth of the saw. Two set-screws, $c^5$, are placed behind the clamps to force them up to the saw properly.

In operation the device is placed upon the saw-arbor and its length adjusted so the edge of the saw lies between the parts of the double arm. The files are then clamped in the clamps $c^3$ and forced up to place, and the device is then moved back and forth till a portion of the saw-teeth are dressed off, and the saw is then given a partial turn, and the operation repeated till the work is completed, which is done very rapidly and easily. As shown in Fig. 2, a slotted gage, $d$, is secured by a set nut or screw, $d'$, upon the outer end of the arm, and may be adjusted inward to suit. When this is in place and the device passed around the saw, it catches upon such teeth as are of improper size, and enables the operator to at once locate and remedy the imperfections.

Having thus fully described my invention, what I claim as new, and desire to secure by Letters Patent, is—

1. In a gage for dressing saws, the combination, with a collar for surrounding the arbor and an arm secured thereto, of a U-shaped extension adjustably secured thereto, provided on its sides with centering or guide screws and at its outer end with L-shaped clamps for holding the files, substantially as and for the purpose set forth.

2. The two-part collar $a$ and slotted arm $b$, in combination with the double extension-arm $c$, the guide-screws $c^2$, adjustable clamps $c^3$, with their thumb-screws $c^5$, and the slotted gage $d$ and securing-nut $d'$, all constructed and arranged to operate substantially as and for the purpose set forth.

In testimony whereof I affix my signature in presence of two witnesses.

GEORGE W. CUTSHAW.

Witnesses:
EDWIN G. LELAND,
LORENZO D. DAILY.